United States Patent
Ikeuchi et al.

(10) Patent No.: US 12,519,674 B2
(45) Date of Patent: Jan. 6, 2026

(54) NOTIFICATION METHOD, RECORDING MEDIUM, NOTIFICATION SYSTEM, AND NOTIFICATION DEVICE

(71) Applicant: Panasonic Intellectual Property Management Co., Ltd., Osaka (JP)

(72) Inventors: Hiromu Ikeuchi, Hyogo (JP); Kentaro Nakai, Hyogo (JP); Yoshiki Ohashi, Osaka (JP); Satoru Matsunaga, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 476 days.

(21) Appl. No.: 17/996,060

(22) PCT Filed: Jan. 11, 2022

(86) PCT No.: PCT/JP2022/000552
§ 371 (c)(1),
(2) Date: Oct. 12, 2022

(87) PCT Pub. No.: WO2023/013097
PCT Pub. Date: Feb. 9, 2023

(65) Prior Publication Data
US 2024/0297806 A1 Sep. 5, 2024

(30) Foreign Application Priority Data
Aug. 4, 2021 (JP) .................................. 2021-128454

(51) Int. Cl.
*H04L 12/28* (2006.01)
(52) U.S. Cl.
CPC .... *H04L 12/2829* (2013.01); *H04L 2012/285* (2013.01)

(58) Field of Classification Search
CPC .......... H04L 12/2829; H04L 2012/285; G06Q 10/20; G06Q 30/016; G06Q 50/10; G16Y 40/10
See application file for complete search history.

(56) References Cited

U.S. PATENT DOCUMENTS

| 9,196,148 | B1 * | 11/2015 | Hutz | .................... G08B 21/18 |
| 2007/0197195 | A1 | 8/2007 | Sugiyama et al. | |
| 2015/0092108 | A1 * | 4/2015 | Okuhara | ............ H04N 21/4316 348/564 |

FOREIGN PATENT DOCUMENTS

| JP | 2010-015418 A | 1/2010 |
| JP | 2015-126477 A | 7/2015 |

(Continued)

OTHER PUBLICATIONS

Extended European Search Report dated Oct. 28, 2024 issued in the corresponding European Patent Application No. 22786878.3.

(Continued)

*Primary Examiner* — Charles R Kasenge
(74) *Attorney, Agent, or Firm* — Rimon P.C.

(57) ABSTRACT

A notification method obtains event information about an even that has occurred from information source device or information source service that is a source of information to be notified by notification device. The notification method generates a first notification trigger when the event information is obtained. The notification method generates a second notification trigger when, after the first notification trigger is generated, a predetermined condition is satisfied and the event information is not updated. The notification method causes notification device to output notification information indicating details of the event in at least one of a case where the first notification trigger is generated or a case where the second notification trigger is generated.

8 Claims, 15 Drawing Sheets

(56) References Cited

FOREIGN PATENT DOCUMENTS

| | | |
|---|---|---|
| JP | 2017-151718 A | 8/2017 |
| JP | 2021-103888 A | 7/2021 |
| WO | 2006/075512 A1 | 7/2006 |

OTHER PUBLICATIONS

International Search Report issued on Apr. 12, 2022 in International Patent Application No. PCT/JP2022/000552.

* cited by examiner

FIG. 2

| Information source | Event | Notification | Renotification |
|---|---|---|---|
| Washing machine | Completion of washing | 'Washing is completed.' | 'Washing was completed while you were out.' 'Is laundry left in washing tub?' |
| | Draining error | 'Error occurs in washing machine. Draining failed. Please check drain hose and drain outlet.' | 'Error has occurred in washing machine 30 minutes ago. Dryer lint filter is clogged. Please clean the filter.' 'Error has occurred while you were out. Dryer lint filter is clogged. Please clean the filter.' |
| | Prediction of rain at completion of washing | 'Washing is completed. Rain is predicted.' | — |
| Robotic vacuum cleaner | Battery exhaustion | 'Battery was exhausted. Please charge.' | 'Battery was exhausted. Please charge.' |
| | Guidance for cleaning dust box | 'Please clean dust box.' | 'Please clean dust box.' |
| | Additional charging | 'Cleaner has returned to charger because battery was exhausted. Cleaning will be resumed after charging.' | — |
| Air purifier | Water supply tank level LOW | 'Tank of air purifier ran out of water.' | 'Tank of air purifier ran out of water while you were out.' |
| Transport service | Missed-delivery notice | 'Missed-delivery notice has been delivered.' | 'Missed-delivery notice has been delivered.' |

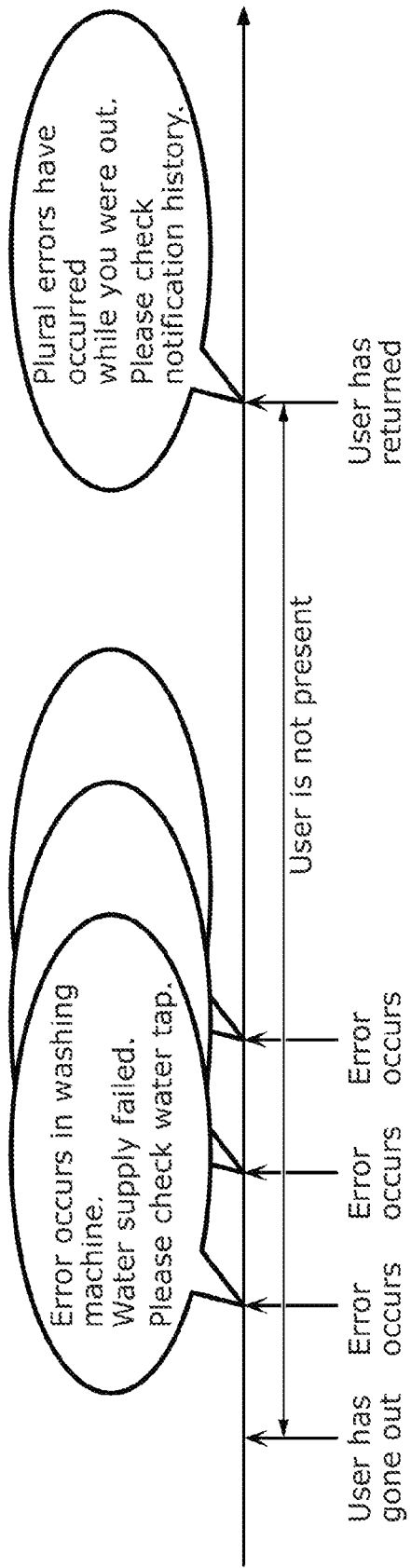

NOTIFICATION METHOD, RECORDING MEDIUM, NOTIFICATION SYSTEM, AND NOTIFICATION DEVICE

CROSS-REFERENCE OF RELATED APPLICATIONS

This application is the U.S. National Phase under 35 U.S.C. 371 of International Patent Application No. PCT/JP2022/000552, filed on Jan. 11, 2022, which in turn claims the benefit of Japanese Patent Application No. 2021-128454, filed on Aug. 4, 2021, the entire disclosures of which Applications are incorporated by reference herein.

TECHNICAL FIELD

The present disclosure relates to a notification method, and so on, in which, when event information about an event is obtained from an information source device or an information source service, a notification device is caused to output notification information indicating details of the event.

BACKGROUND ART

Patent Literature (PTL) 1, for example, discloses a technique for causing a household device having a voice input/output function to make an utterance, by instructing the content and timing of the utterance to the household device.

CITATION LIST

Patent Literature

[PTL 1] Japanese Unexamined Patent Application Publication No. 2017-151718

SUMMARY OF INVENTION

Technical Problem

The present disclosure provides a notification method, and so on, by which a user easily notices an occurrence of an event that should be handled by the user.

Solution to Problem

A notification method according to an aspect of the present disclosure includes: obtaining event information about an event that has occurred from an information source device or an information source service that is a source of information to be notified by a notification device; generating a first notification trigger when the event information is obtained; generating a second notification trigger when, after the first notification trigger is generated, a predetermined condition is satisfied and the event information is not updated; and causing the notification device to output notification information indicating details of the event in at least one of a case where the first notification trigger is generated or a case where the second notification trigger is generated.

A recording medium according to an aspect of the present disclosure is a non-transitory computer-readable recording medium that has recorded thereon a program for causing one or more processors to execute the notification method.

Notification system according to an aspect of the present disclosure includes an obtainer, a first generator, a second generator, and a processing unit. The obtainer obtains event information about an event that has occurred from an information source device or an information source service that is a source of information to be notified by a notification device. The first generator generates a first notification trigger when the event information is obtained. The second generator generates a second notification trigger when, after the first notification trigger is generated, a predetermined condition is satisfied and the event information is not updated. The processing unit causes the notification device to output notification information indicating details of the event in at least one of a case where the first notification trigger is generated or a case where the second notification trigger is generated.

A notification device according to an aspect of the present disclosure includes an instruction obtainer and an outputter. The instruction obtainer obtains an instruction for outputting the notification information from the notification system. The outputter outputs the notification information when the instruction is obtained by the instruction obtainer.

Advantageous Effects of Invention

The notification method, and so on, according to the present disclosure has the advantage that it becomes easy for a user to notice an occurrence of an event that should be handled by the user.

BRIEF DESCRIPTION OF DRAWINGS

FIG. 2 illustrates notification information to be outputted by a notification device according to the embodiment.

FIG. 15 illustrates a tenth operation example of the notification system according to the embodiment.

DESCRIPTION OF EMBODIMENTS (Underlying Knowledge Forming Basis of Present Disclosure)

The aim of the inventors will be described below.

Conventionally, as disclosed in PTL 1, there is a technique for causing a household device (notification device) having a voice input/output function to make an utterance (notification) by instructing the content and timing of the utterance to the household device. This technique is used for, for example, causing a notification device having a voice input/output function to utter details of an event that has occurred in a home appliance, such as a washing machine, to thereby notify the details of the event to a user who is away from the home appliance. The event may include occurrence of some sort of error in the home appliance or completion of an operation executed by the home appliance, for example.

However, there are cases where the user is away from the notification device when the notification device notifies the details of the event, such as when the user is out or is in a different place from an installation location of the notification device, for example. In such a case, there is a problem that, since notification by the notification device does not reach the user, the user does not notice the occurrence of the event, and thus cannot handle the event. Such a problem may occur even when the user is near the installation location of the notification device. Specifically, there are cases where the user does not notice notification by the notification device, such as when the user is asleep or wearing earphones.

The present disclosure is conceived in view of the above problem.

Hereinafter, the embodiment will be described in detail with reference to the drawings. However, there are instances where overly detailed description is omitted. For example, detailed descriptions of well-known matters or descriptions of elements that are substantially the same as elements described previous thereto may be omitted. This is to prevent the subsequent description from becoming unnecessarily redundant, and thus facilitate understanding by a person having ordinary skill in the art.

Note that the inventors provide the accompanying drawings and the following description not to limit the scope of the claims, but to aid those skilled in the art to adequately understand the present disclosure.

Embodiment

[1-1. Overall Configuration]

Figure 1:
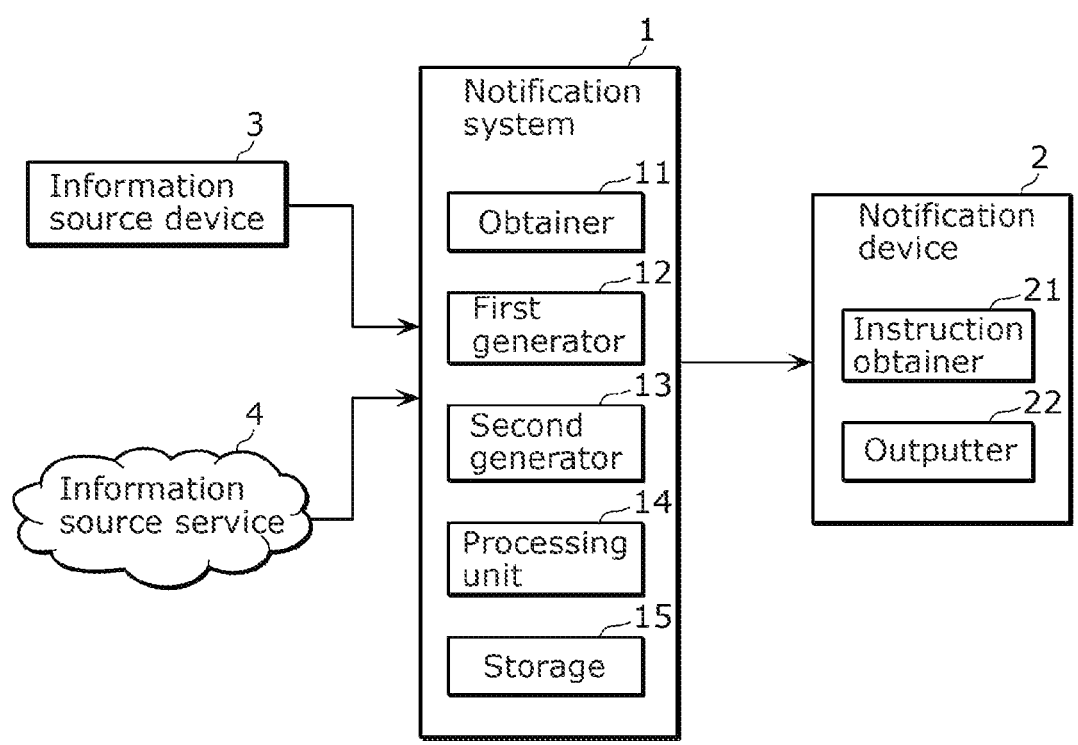
FIG. 1 is a block diagram illustrating an overall configuration including a notification system according to an embodiment.

An overall configuration including notification system 1 according to an embodiment will be described with reference to FIG. 1. FIG. 1 is a block diagram illustrating an overall configuration including notification system 1 according to the embodiment. Notification system 1 is a system that, when event information about an event is obtained from information source device 3 or information source service 4, causes notification device 2 to output notification information indicating the details of the event.

Notification device 2 is a device capable of notifying user U1 (see FIG. 3A) of the details of the event that has occurred in information source device 3 or information source service 4. In the embodiment, notification by notification device 2 is performed by outputting voice from a speaker for example. It should be noted that notification by notification device 2 may be performed by displaying a text, an image, or the like on a display provided in notification device 2, and may also be performed by both outputting voice and displaying a text, an image, or the like, for example.

Notification device 2 is, for example, a device that is installed in a building in which user U1 lives and has the above-described voice output function or display function. In the embodiment, notification device 2 is a home appliance. Specifically, notification device 2 may include, for example, a smart speaker, a television receiver, a lighting appliance, a pet camera, an interphone master unit, an interphone sub unit, an air conditioner, or a robotic vacuum cleaner. It should be noted that notification device 2 may be a portable information device carried around by user U1, such as a portable television receiver, a smartphone, a tablet terminal, or a laptop computer.

Notification device 2 includes instruction obtainer 21 and outputter 22. In the embodiment, notification device 2 includes a processor and a memory. The respective constituent elements of notification device 2 are implemented by the processor executing a computer program stored in the memory.

Instruction obtainer 21 obtains, from notification system 1, an instruction for outputting the notification information. In the embodiment, for example, instruction obtainer 21 receives an instruction signal transmitted from notification system 1 via a network such as the Internet to thereby obtain the instruction included in the instruction signal.

Outputter 22 outputs the notification information after instruction obtainer 21 obtains the instruction. For example, in a case where notification device 2 has a voice output function, outputter 22 outputs the notification information by reproducing a voice message included in the instruction. In a case where various voice messages are stored in advance in the memory of notification device 2, outputter 22 may retrieve a corresponding voice message from the memory in accordance with the instruction and reproduce the corresponding voice message. In a case where notification device 2 has a function for automatic voice generation, outputter 22 may generate a corresponding voice message in accordance with the instruction and reproduce the corresponding voice message.

For example, in a case where notification device 2 has a display function, outputter 22 outputs the notification information by displaying, on a display, a text, an image, or the like included in the instruction. In a case where various texts, images, or the like are stored in advance in the memory of notification device 2, outputter 22 may retrieve a corresponding text, image, or the like from the memory in accordance with the instruction and display the corresponding text, image, or the like on a display. In a case where notification device 2 has a function for automatic text generation, a function for automatic image generation, or the like, outputter 22 may generate a corresponding text, image, or the like in accordance with the instruction and display the corresponding text, image, or the like on a display.

Information source device 3 is a device that is a source of information to be notified by notification device 2. In the embodiment, information source device 3 is a home appliance. Specifically, information source device 3 is, for example, an air conditioner, a washing machine, a robotic vacuum cleaner, a refrigerator, a rice cooker, or a microwave oven. The event that occurs in information source device 3 may include, for example, start or completion of an operation of information source device 3, occurrence of an error in information source device 3, or maintenance of information source device 3.

Information source service 4 is a service that is a source of information to be notified by notification device 2 and is provided to user U1 from a server operated by a service provider, for example. Information source service 4 is, for example, a transport service or a weather forecast service. The event that occurs in information source service 4 may include, for example, start or completion of a service by information source service 4 or occurrence of an error in information source service 4.

[1-2. Notification System]

Hereinafter, notification system 1 will be described in detail. As shown in FIG. 1, notification system 1 includes obtainer 11, first generator 12, second generator 13, processing unit 14, and storage 15. In the embodiment, notification system 1 includes storage 15; however, storage 15 need not be a constituent element of notification system 1.

In the embodiment, notification system 1 is implemented by a server. The server includes a processor and a memory. The respective constituent elements of notification system 1 are implemented by the processor executing a computer program stored in the memory. In the embodiment, the memory is storage 15.

Notification system 1 is, for example, configured to communicate with notification device 2, information source device 3, and information source service 4 via a network such as the Internet. Although one each of notification device 2, information source device 3, and information source service 4 are provided in the example shown in FIG. 1, a plurality of each may be provided.

Obtainer 11 obtains event information about an event that has occurred from information source device 3 or information source service 4. In the embodiment, for example, obtainer 11 receives a signal transmitted from information source device 3 or information source service 4 via a network such as the Internet to thereby obtain the event information included in the signal. Information source device 3 or information source service 4 transmits the signal to notification system 1 at the time when the event occurs. Accordingly, obtainer 11 obtains the event information around the time when the event occurs in information source device 3 or information source service 4. The timing at which obtainer 11 obtains the event information may be later than the time when the event occurs in information source device 3 or information source service 4.

First generator 12 generates a first notification trigger when the event information is obtained. For example, when obtainer 11 obtains event information from information source device 3, first generator 12 generates the first notification trigger corresponding to the event information. Furthermore, for example, when obtainer 11 obtains a plurality of event information from a corresponding plurality of information source devices 3, first generator 12 generates a plurality of first notification triggers corresponding to the plurality of event information. That is, first generator 12 generates the first notification trigger for each event that occurs in information source device 3 or information source service 4.

Second generator 13 generates a second notification trigger when, after the first notification trigger is generated, a predetermined condition is satisfied and the event information is not updated. The predetermined condition will be described in detail in [2. Operation Example] below. For example, after first generator 12 has generated the first notification trigger, second generator 13 monitors whether the predetermined condition is satisfied. Then, when the predetermined condition is satisfied, second generator 13 compares event information obtained by obtainer 11 at the time when the predetermined condition is satisfied with the event information obtained by obtainer 11 at the time when the first notification trigger is generated. It should be noted that, when the predetermined condition is not satisfied, second generator 13 does not generate the second notification trigger.

When second generator 13 determines that the event information is updated based on the result of the comparison, second generator 13 does not generate the second notification trigger. When second generator 13 determines that the event information is not updated based on the result of the comparison, second generator 13 generates the second notification trigger. For example, in a case where the event that has occurred in information source device 3 is occurrence of an error in information source device 3, the event information is updated if the error in information source device 3 is solved, and the event information is not updated if the error in information source device 3 persists. As with first generator 12, second generator 13 generates the second notification trigger for each event that occurs in information source device 3 or information source service 4.

Processing unit 14 causes notification device 2 to output notification information indicating the details of the event in at least one of a case where the first notification trigger is generated or a case where the second notification trigger is generated. In the embodiment, for example, processing unit 14 transmits the instruction signal to notification device 2 via a network such as the Internet to thereby cause notification device 2 to output the notification information.

Basically, processing unit 14 causes notification device 2 to output notification information in either one of a case where the first notification trigger is generated and a case where the second notification trigger is generated. Specifically, processing unit 14 basically causes notification device 2 to perform initial notification in a case where the first notification trigger is generated and then, causes notification device 2 to perform renotification in a case where the second notification trigger is generated. Here, processing unit 14 may change a part of the notification information in a case where the second notification trigger is generated, from the notification information in a case where the first notification trigger is generated. For example, when the second notification trigger is generated after a certain period of time has elapsed from when the first notification trigger is generated, processing unit 14 may change the notification information in a case where the second notification trigger is generated into notification information that takes into consideration the elapsed time from when the first notification trigger is generated.

Although it will be described in detail in [2. Operation Example] below, there are cases where, depending on the situation where the first notification trigger is generated, processing unit 14 does not cause notification device 2 to output the notification information even when the first notification trigger is generated. Furthermore, there are cases where, depending on each of the situations where the first notification trigger is generated and where the second notification trigger is generated, processing unit 14 does not cause notification device 2 to output the notification information even when the second notification trigger is generated Here, an example of the notification information to be outputted by notification device 2 will be described with reference to FIG. 2. FIG. 2 illustrates notification information to be outputted by notification device 2 according to the embodiment. In the table shown in FIG. 2, 'source of information' represents information source device 3 or information source service 4 and 'event' represents the event occurs in information source device 3 or information source service 4. Furthermore, in the table shown in FIG. 2, 'notification' represents notification by notification device 2 when the first notification trigger is generated, that is, initial notification by notification device 2. Furthermore, in the table shown in FIG. 2, 'renotification' represents notification by notification device 2 when the second notification trigger is generated, that is, renotification by notification device 2. The event for which renotification is performed by notification device 2 is basically the event that should be handled by user U1.

For example, in a case where information source device 3 is a washing machine, notification device 2 outputs a voice message of 'Washing is completed.' in initial notification when an event of 'Completion of washing' occurs. Furthermore, notification device 2 outputs a voice message of 'Washing was completed while you were out.' in renotification when user U1 has returned home, for example. Alternatively, notification device 2 outputs a voice message of 'Is laundry left in washing tub?' in renotification, for example.

Furthermore, for example, notification device 2 outputs a voice message of 'Washing is completed. Rain is predicted.' when an event of 'Prediction of rain at completion of washing' occurs, that is, when an event in which rain is predicted at the time of completion of washing occurs. It should be noted that, although renotification is not performed by notification device 2 for this event, renotification may be performed.

Furthermore, in a case where information source device 3 is a robotic vacuum cleaner, for example, notification device 2 outputs a voice message of 'Cleaner has returned to charger because battery was exhausted. Cleaning will be resumed after charging.' when an event of 'Additional charging' occurs, that is, when an event in which the robotic vacuum cleaner automatically starts charging because of battery exhaustion occurs. It should be noted that, although renotification is not performed by notification device 2 for this event, renotification may be performed.

Furthermore, in a case where information source service 4 is a transport service, for example, notification device 2 outputs a voice message of 'Missed-delivery notice has been delivered.' in initial notification when an event of 'missed-delivery notice' occurs, that is, when an event in which a missed-delivery notice was put in a mailbox because user U1 was not present at the time of delivery occurs. Furthermore, notification device 2 also outputs the voice message of 'Missed-delivery notice has been delivered.' in renotification. It should be noted that, for this event, notification device 2 may also output a voice message of 'Missed-delivery notice has been delivered while you were out.' when notification device 2 performs renotification when user U1 has returned home, for example.

Storage 15 is a storage device in which information (e.g., a computer program) necessary for the processor of notification system 1 to execute various controls is stored. Storage 15 is implemented by a semiconductor memory device, for example, but is not limited to this, and various known means for storing electronic information can be used. Storage 15 stores an identifier of information source device 3 or information source service 4, the event information, and management data associated with the first notification trigger and the second notification trigger, for example. Furthermore, storage 15 stores instruction data included in the instruction signal to be transmitted to notification device 2, for example.

[1-3. Basic Operation]

Figure 3A:
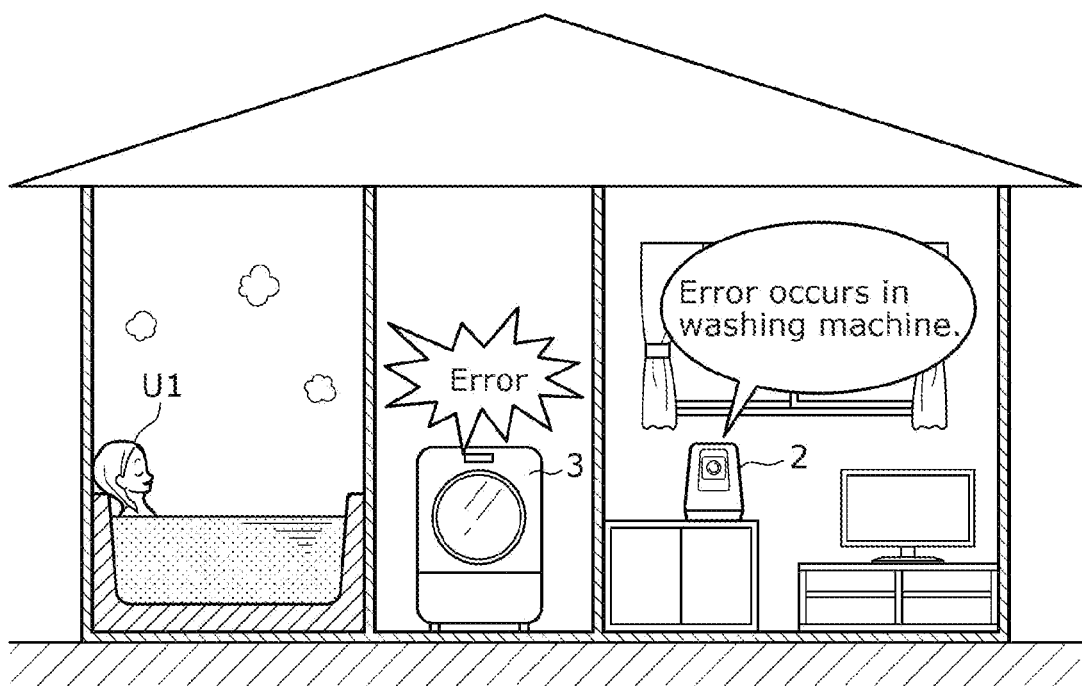
FIG. 3A is a schematic diagram illustrating an example of notification by the notification device according to the embodiment.
Figure 3B:
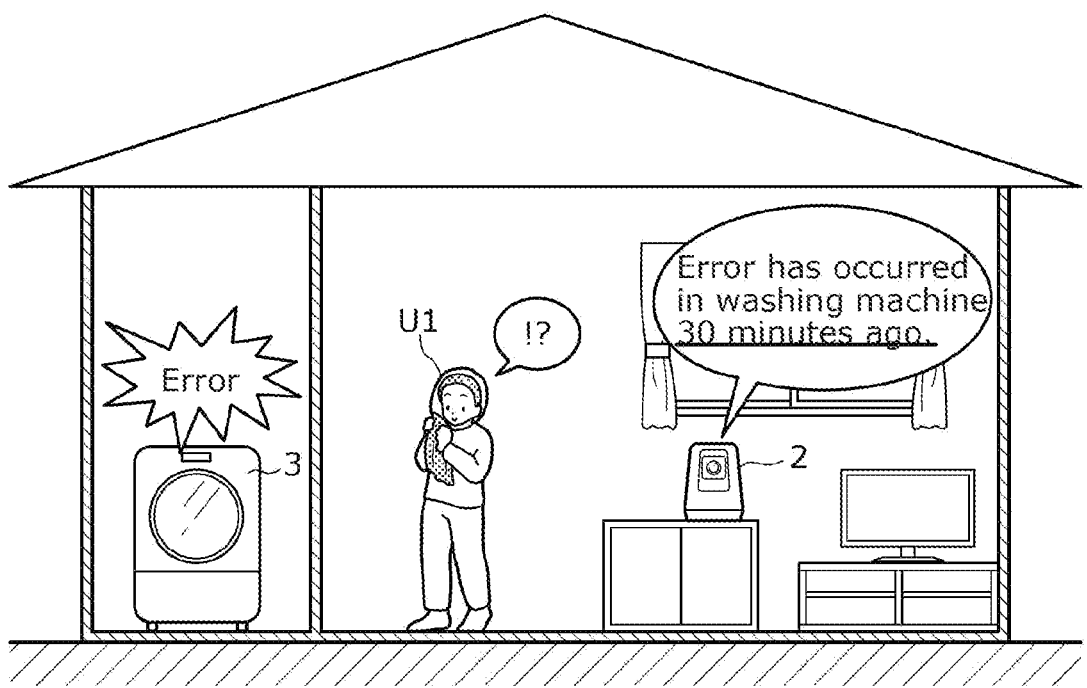
FIG. 3B is a schematic diagram illustrating an example of renotification by the notification device according to the embodiment.

Hereinafter, an overview of operation of notification device 2 according to the embodiment will be described with reference to FIG. 3A and FIG. 3B. FIG. 3A is a schematic diagram illustrating an example of notification by notification device 2 according to the embodiment. FIG. 3B is a schematic diagram illustrating an example of renotification by notification device 2 according to the embodiment. In the example shown in FIG. 3A and FIG. 3B, a pet camera which is notification device 2 is disposed in a living room and a washing machine which is information source device 3 is disposed in a lavatory. In FIG. 3B, the illustration for a bathroom is omitted in order to emphasize the illustration for a living room.

As shown in FIG. 3A, when an error occurs in the washing machine (information source device 3), a pet camera (notification device 2) outputs a voice message of 'Error occurs in washing machine.' as notification information. Here, in the example shown in FIG. 3A, user U1 is having a bath in the bathroom. Thus, user U1 cannot hear the voice message reproduced in the living room and does not notice the occurrence of the event (the occurrence of the error in the washing machine) that should be handled by user U1.

Then, as shown in FIG. 3B, the pet camera (notification device 2) performs renotification by outputting a voice message of 'Error has occurred in washing machine 30 minutes ago.' as notification information. Here, because notification device 2 performs the renotification at the time when a certain period of time (30 minutes in this case) has elapsed from the initial notification, notification device 2 reproduces, in the renotification, a voice message that takes into consideration the elapsed time. In this way, user U1 who has returned from the bathroom to the living room can hear the voice message of the renotification reproduced in the living room and can notice the occurrence of the event (the occurrence of the error in the washing machine) that should be handled by user U1.

Figure 4A:
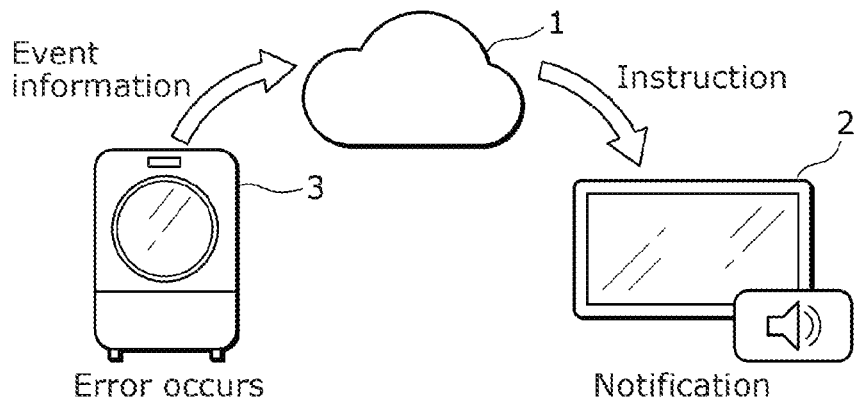
FIG. 4A illustrates an operation of the notification system according to the embodiment when an event occurs.
Figure 4B:
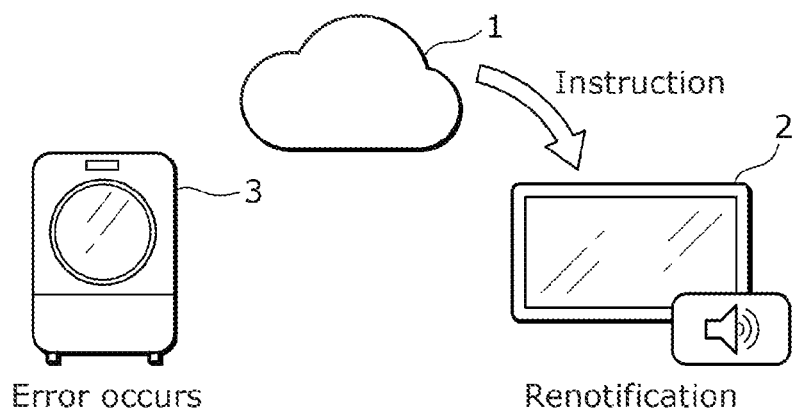
FIG. 4B illustrates an operation of the notification system according to the embodiment after the event has occurred.
Figure 4C:
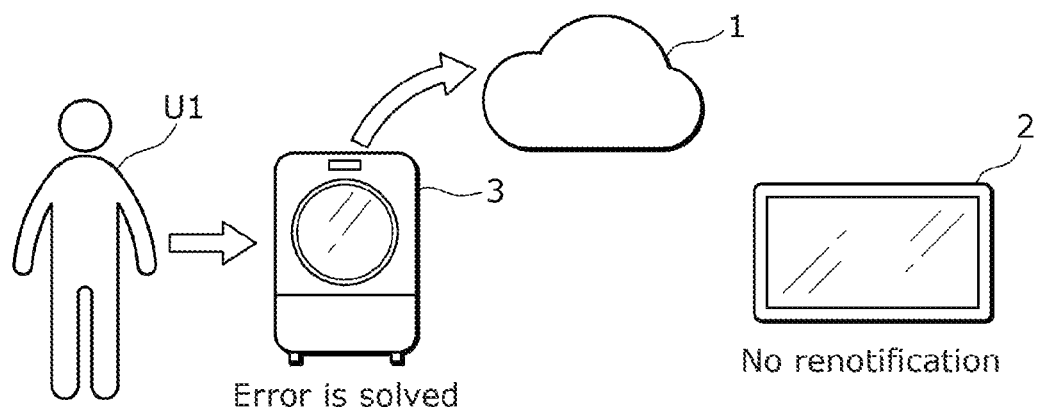
FIG. 4C illustrates another operation of the notification system according to the embodiment after the event has occurred.

Hereinafter, an overview of operation of notification system 1 for implementing the operation of notification device 2 will be described with reference to FIG. 4A to FIG. 4C. FIG. 4A illustrates an operation of notification system 1 according to the embodiment when an event occurs. FIG. 4B illustrates an operation of notification system 1 according to the embodiment after an event has occurred. FIG. 4C illustrates another operation of notification system 1 according to the embodiment after an event has occurred. In the examples shown in FIG. 4A to FIG. 4C, a washing machine is information source device 3 and an event of an error in the washing machine occurs. Furthermore, in the examples shown in FIG. 4A to FIG. 4C, a television receiver is notification device 2 and notification information is outputted by voice.

As shown in FIG. 4A, when the error occurs in the washing machine (information source device 3), a signal including event information is transmitted to notification system 1 from information source device 3. In notification system 1, first generator 12 generates the first notification trigger when obtainer 11 obtains the event information by receiving the signal. Following the generation of the first notification trigger, processing unit 14 transmits an instruction signal including an instruction to the television receiver (notification device 2). When notification device 2 receives the instruction signal, notification device 2 outputs notification information by voice in accordance with the instruction included in the instruction signal. Accordingly, initial notification by notification device 2 is performed.

In the example shown in FIG. 4B, the event information is not updated (in this case, the error in the washing machine is not solved) at the time when the predetermined condition is satisfied (in this case, when a certain period of time has elapsed from when the first notification trigger is generated). In this case, second generator 13 generates the second notification trigger. Following the generation of the second notification trigger, processing unit 14 transmits an instruction signal including an instruction to notification device 2. When notification device 2 receives the instruction signal, notification device 2 outputs notification information by voice in accordance with the instruction included in the instruction signal. Thus, renotification by notification device 2 is performed.

In contrast, in the example shown in FIG. 4C, the error in the washing machine is solved by inspection of the washing machine by user U1, for example. In other words, in the example shown in FIG. 4C, the event information is updated (in this case, the error in the washing machine is solved) at the time when the predetermined condition is satisfied (in this case, when a certain period of time has elapsed from when the first notification trigger is generated). In this case, second generator 13 does not generate the second notification trigger and processing unit 14 does not transmit an instruction signal to notification device 2. Thus, renotification by notification device 2 is not performed.

Figure 5:
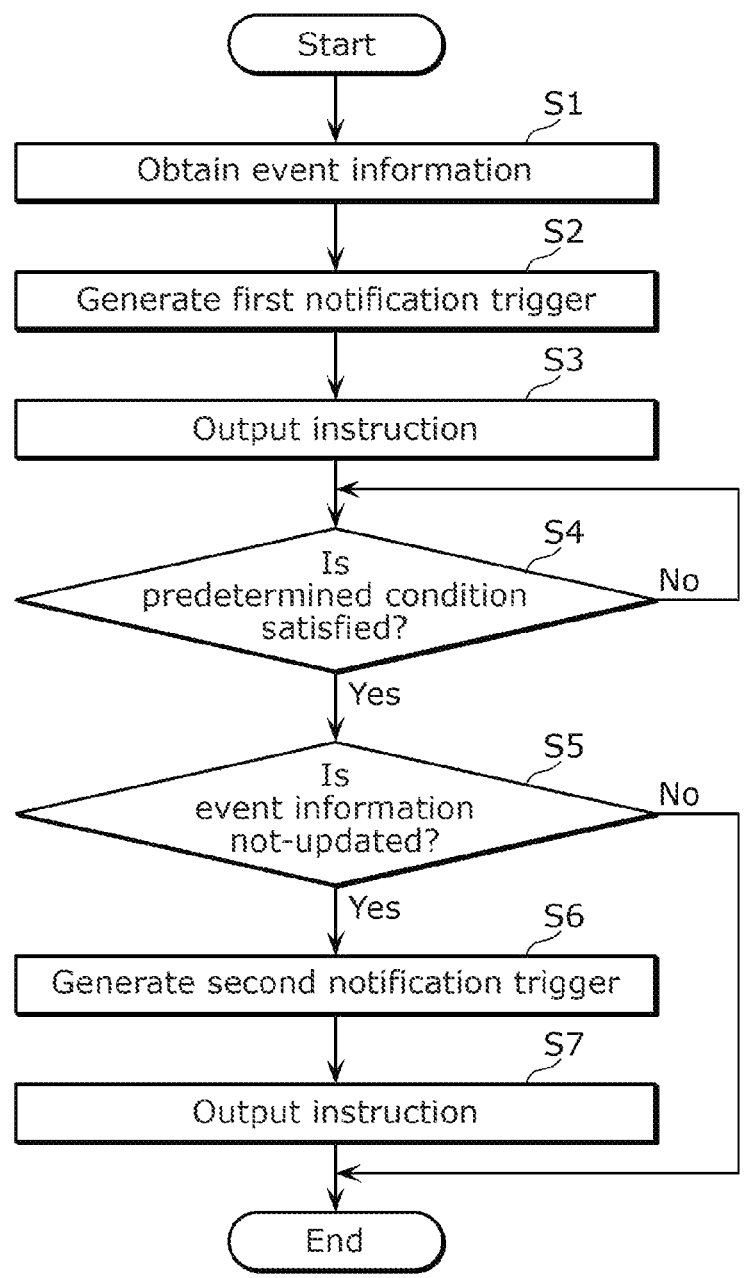
FIG. 5 is a flowchart illustrating an operation example of the notification system according to the embodiment.

Hereinafter, the basic operation (i.e., notification method) of notification system 1 according to the embodiment will be described with reference to FIG. 5. FIG. 5 is a flowchart illustrating an operation example of notification system 1 according to the embodiment. Here, description is carried out under the assumption that, in notification system 1, notification device 2 is caused to output notification information in either one of a case where the first notification trigger is generated and a case where the second notification trigger is generated.

When an event occurs in information source device 3 or information source service 4, information source device 3 or information source service 4 transmits a signal including event information to notification system 1. Thus, obtainer 11 obtains the event information (S1). When obtainer 11 obtains the event information, first generator 12 generates the first notification trigger (S2). Then, following the generation of the first notification trigger, processing unit 14 transmits an instruction signal including an instruction, that is, outputs an instruction, to notification device 2 (S3). Notification device 2 which has received the instruction signal outputs notification information in accordance with the instruction included in the instruction signal.

Subsequently, notification system 1 does not perform any operation until the predetermined condition is satisfied (S4: No). When the predetermined condition is satisfied (S4: Yes), notification system 1 checks whether the event information is updated at the time when the predetermined condition is satisfied. Then, when the event information is updated (S5: No), notification system 1 does not perform any operation. On the other hand, when the event information is not updated (S5: Yes), second generator 13 generates the second notification trigger (S6). Then, following the generation of the second notification trigger, processing unit 14 transmits an instruction signal including an instruction, that is, outputs an instruction, to notification device 2 (S7). The current instruction may be the same as the previous instruction and may be partly changed in accordance with the situation at the time when the current instruction signal is transmitted. Notification device 2 which has received the instruction signal outputs notification information in accordance with the instruction included in the instruction signal.

2. Operation Example

Hereinafter, operation examples of notification system 1 according to the embodiment will be described. In the operation examples below, except for the tenth operation example, description is carried out under the assumption that information source device 3 is a washing machine and the event is an error about water supply abnormality that occurs in the washing machine. Furthermore, in all of the operation examples below, description is carried out under the assumption that the second notification trigger is generated, that is, event information is not updated at the time when the predetermined condition is satisfied. It should be noted that the operation examples below are merely examples and notification system 1 may perform operation other than the operation examples below.

2-1. First Operation Example

Figure 6:
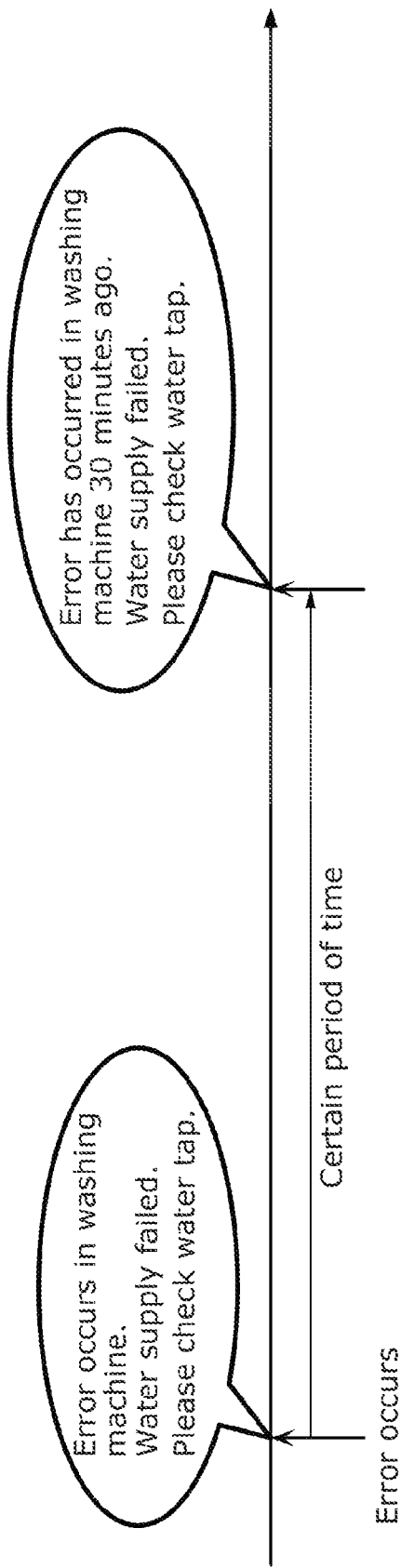
FIG. 6 illustrates a first operation example of the notification system according to the embodiment.

FIG. 6 illustrates a first operation example of notification system 1 according to the embodiment. In the first operation example, notification system 1 causes notification device 2 to perform notification by voice at the time when the error occurs in the washing machine and the first notification trigger is generated. Then, in the first operation example, notification system 1 generates the second notification trigger at the time when a certain period of time (30 minutes in this case) has elapsed from when the first notification trigger is generated, to thereby cause notification device 2 to perform renotification by voice. In other words, in the first operation example, the predetermined condition is that a certain period of time elapses from when the first notification trigger is generated. It should be noted that, in the renotification following the lapse of a certain period of time, notification system 1 causes notification device 2 to perform notification that takes into consideration that the error has occurred in the washing machine a certain period of time ago.

2-2. Second Operation Example

Figure 7:
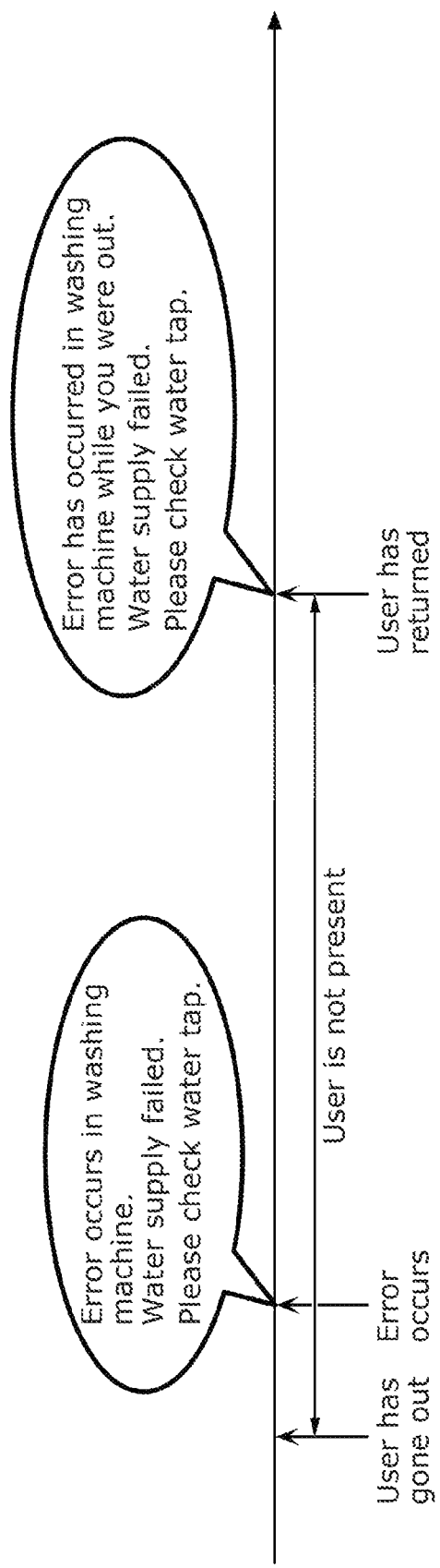
FIG. 7 illustrates a second operation example of the notification system according to the embodiment.

FIG. 7 illustrates a second operation example of notification system 1 according to the embodiment. In the second operation example, notification system 1 causes notification device 2 to perform notification by voice at the time when the error occurs in the washing machine and the first notification trigger is generated. It should be noted that, in the second operation example, at the time when the first notification trigger is generated, user U1 is not present because user U1 has gone out. Then, in the second operation example, notification system 1 generates the second notification trigger at the time when user U1 has returned home, to thereby cause notification device 2 to perform renotification by voice. In other words, in the second operation example, the predetermined condition is that the first notification trigger is generated while user U1 is not present and user U1 has returned. It should be noted that, in the renotification following the return of user U1, notification system 1 causes notification device 2 to perform notification that takes into consideration that the error has occurred in the washing machine while user U1 was out.

Notification system 1 is, for example, able to determine presence or absence of user U1 by obtaining, from an information terminal, such as a smartphone, carried around by user U1, a detection result of a positioning system, such as a global positioning system (GPS), provided in the information terminal. Here, the detection result only includes information about presence or absence of user U1 and does not include positional information of user U1.

2-3. Third Operation Example

Figure 8:
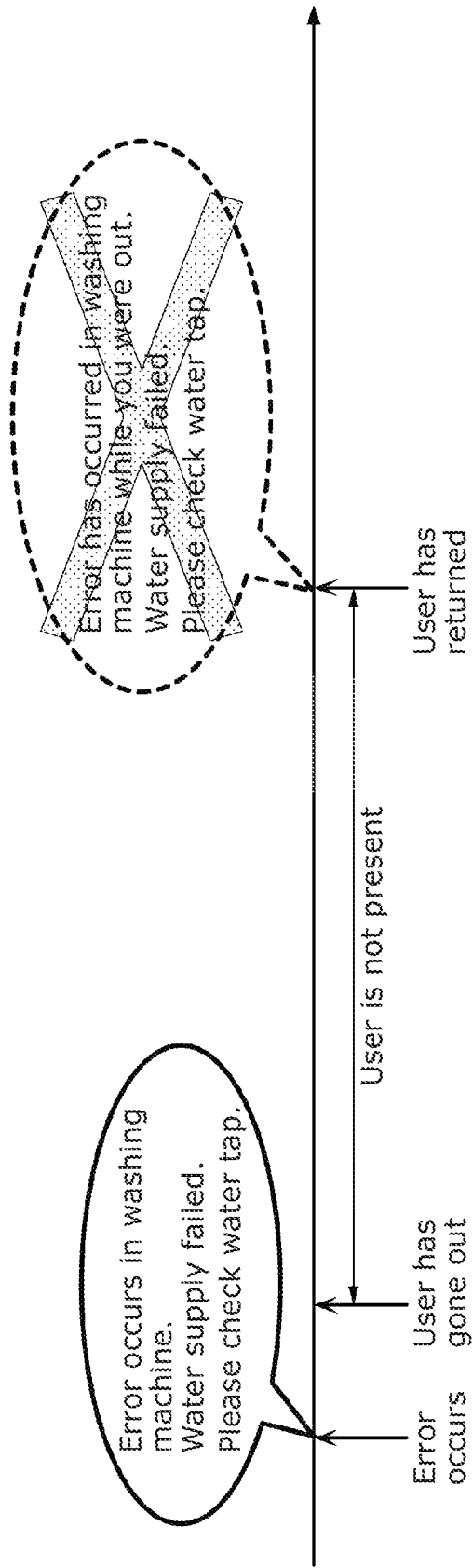
FIG. 8 illustrates a third operation example of the notification system according to the embodiment.

FIG. 8 illustrates a third operation example of notification system 1 according to the embodiment. The 'X' mark shown in FIG. 8 represents a case where notification by notification device 2 is not performed. Hereinafter, the same applies to FIG. 11 to FIG. 14. Unlike in the second operation example, in the third operation example, the error occurs in the washing machine and the first notification trigger is generated before user U1 goes out. Thus, in the third operation example, notification system 1 does not cause notification device 2 to perform renotification by voice even when user U1 has returned home and the second notification trigger is generated. Accordingly, in the third operation example, notification system 1 causes notification device 2 to perform notification only when the first notification trigger is generated.

2-4. Fourth Operation Example

Figure 9:
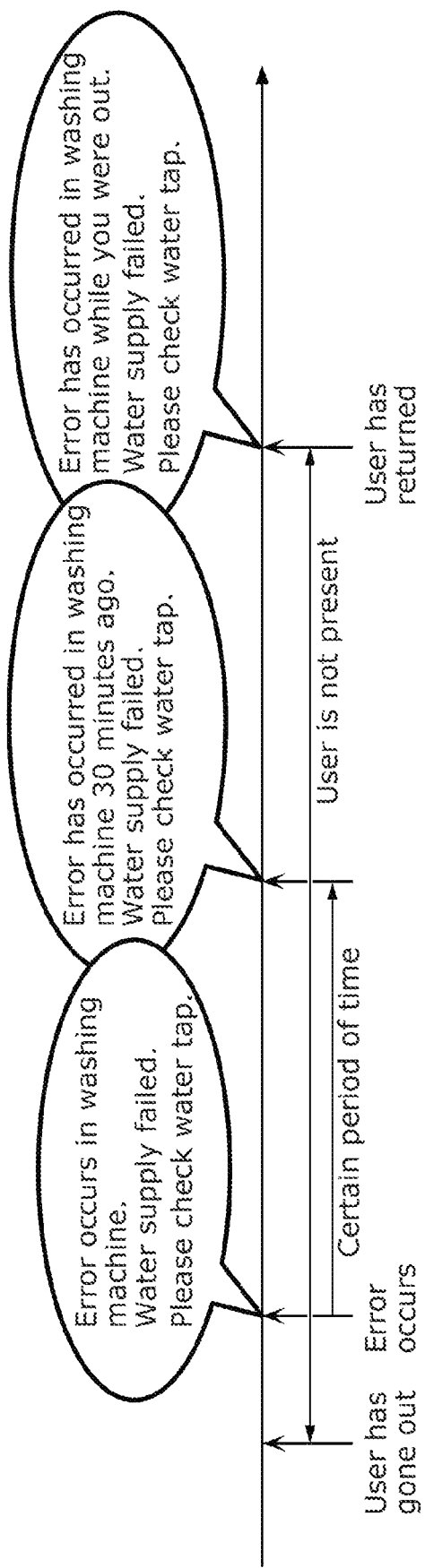
FIG. 9 illustrates a fourth operation example of the notification system according to the embodiment.

FIG. 9 illustrates a fourth operation example of notification system 1 according to the embodiment. In the fourth operation example, the error occurs in the washing machine and the first notification trigger is generated while user U1 is not present. Additionally, before user U1 returns home, a certain period of time has elapsed from when the first notification trigger is generated. In the fourth operation example, notification system 1 causes notification device 2 to perform notification by voice at the time when the first notification trigger is generated. Then, in the fourth operation example, notification system 1 generates the second notification trigger to thereby cause notification device 2 to perform renotification by voice at the time when a certain period of time (30 minutes in this case) has elapsed from when the first notification trigger is generated. Furthermore, in the fourth operation example, notification system 1 generates the second notification trigger to thereby cause notification device 2 to perform renotification by voice also at the time when user U1 has returned home. In other words, in the fourth operation example, the second notification trigger is generated in both of a case where the predetermined condition that a certain period of time elapses is satisfied and a case where the predetermined condition that user U1 has returned is satisfied.

2-5. Fifth Operation Example

Figure 10:
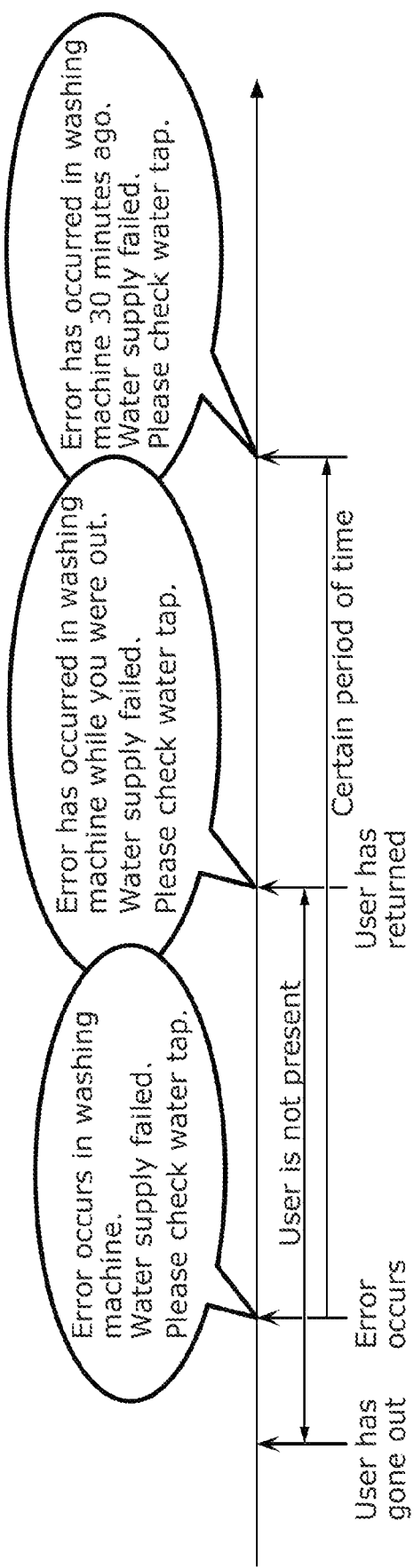
FIG. 10 illustrates a fifth operation example of the notification system according to the embodiment.

FIG. 10 illustrates a fifth operation example of notification system 1 according to the embodiment. In the fifth operation example, the error occurs in the washing machine and the first notification trigger is generated while user U1 is not present. Additionally, after user U1 has returned home, a certain period of time elapses from when the first notification trigger is generated. In the fifth operation example, notification system 1 causes notification device 2 to perform notification by voice at the time when the first notification trigger is generated. Then, as with the fourth operation example, in the fifth operation example, the second notification trigger is generated and thus notification system 1 causes notification device 2 to perform renotification by voice, at both times when user U1 has returned home and when a certain period of time (30 minutes in this case) has elapsed from when the first notification trigger is generated.

2-6. Sixth Operation Example

Figure 11:
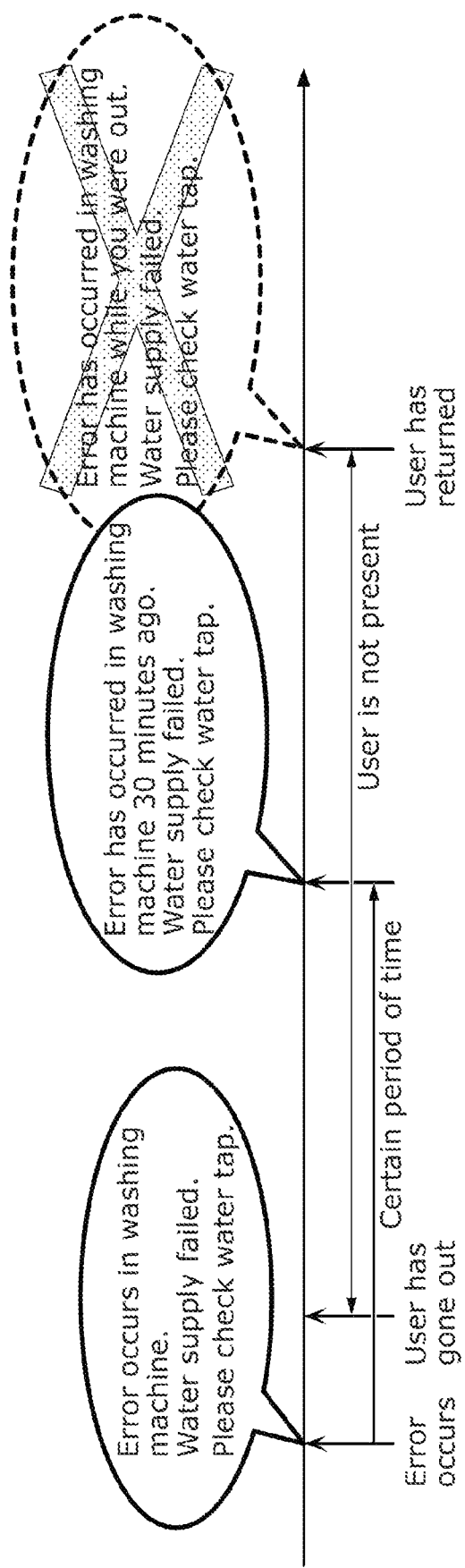
FIG. 11 illustrates a sixth operation example of the notification system according to the embodiment.

FIG. 11 illustrates a sixth operation example of notification system 1 according to the embodiment. In the sixth operation example, the error occurs in the washing machine and the first notification trigger is generated before user U1 goes out. Additionally, before user U1 returns home, a certain period of time has elapsed from when the first notification trigger is generated. In the sixth operation example, notification system 1 causes notification device 2 to perform notification by voice at the time when the first notification trigger is generated. Then, in the sixth operation example, notification system 1 generates the second notification trigger to thereby cause notification device 2 to perform renotification by voice at the time when a certain period of time (30 minutes in this case) has elapsed from when the first notification trigger is generated.

On the contrary, as with the third operation example, in the sixth operation example, notification system 1 does not cause notification device 2 to perform renotification by voice even when user U1 has returned home and the second notification trigger is generated. Accordingly, in the sixth operation example, notification system 1 causes notification device 2 to perform renotification by voice in response to only the generation of the second notification trigger corresponding to the predetermined condition that a certain period of time elapses.

2-7. Seventh Operation Example

Figure 12:
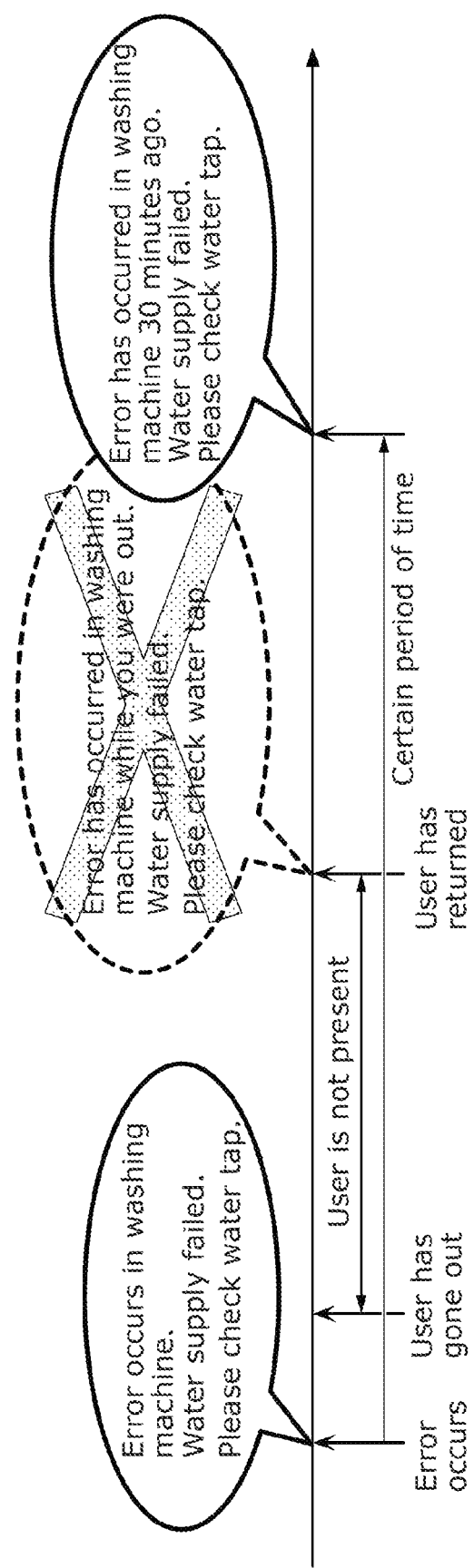
FIG. 12 illustrates a seventh operation example of the notification system according to the embodiment.

FIG. 12 illustrates a seventh operation example of notification system 1 according to the embodiment. In the seventh operation example, the error occurs in the washing machine and the first notification trigger is generated before user U1 goes out. Additionally, after user U1 has returned home, a certain period of time elapses from when the first notification trigger is generated. In the seventh operation example, notification system 1 causes notification device 2 to perform notification by voice at the time when the first notification trigger is generated. Then, as with the sixth operation example, in the seventh operation example, notification system 1 does not cause notification device 2 to perform renotification by voice even when user U1 has returned home and the second notification trigger is generated.

On the contrary, as with the sixth operation example, in the seventh operation example, notification system 1 generates the second notification trigger to thereby cause notification device 2 to perform renotification by voice at the time when a certain period of time (30 minutes in this case) has elapsed from when the first notification trigger is generated. Accordingly, as with the sixth operation example, in the seventh operation example, notification system 1 causes notification device 2 to perform renotification by voice in response to only the generation of the second notification trigger corresponding to the predetermined condition that a certain period of time elapses.

2-8. Eighth Operation Example

Figure 13:
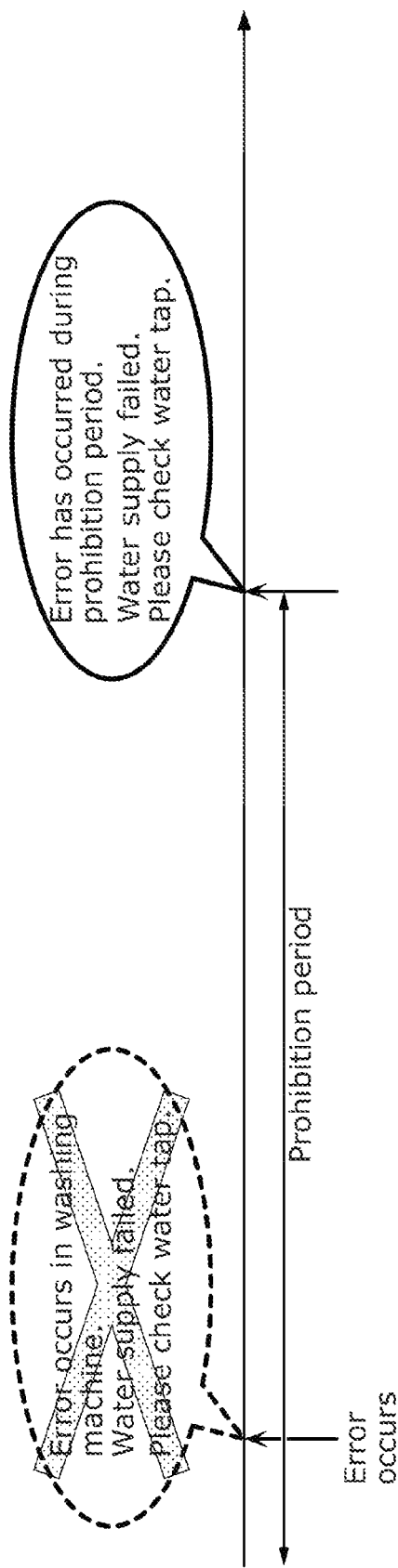
FIG. 13 illustrates an eighth operation example of the notification system according to the embodiment.

FIG. 13 illustrates an eighth operation example of notification system 1 according to the embodiment. In the eighth operation example, the error occurs in the washing machine and the first notification trigger is generated during a prohibition period in which outputting of notification information by notification device 2 is prohibited. Therefore, in the eighth operation example, notification system 1 does not cause notification device 2 to perform notification by voice even when the first notification trigger is generated. Here, the prohibition period is a period in which user U1 does not want to receive notification by notification device 2, such as at nighttime when user U1 is asleep. The prohibition period can be appropriately set by user U1, for example.

Then, in the eighth operation example, notification system 1 generates the second notification trigger to thereby cause notification device 2 to perform notification by voice at the time when the prohibition period has ended. In other words, in the eighth operation example, the predetermined condition is that the first notification trigger is generated during the prohibition period in which outputting of notification information by notification device 2 is prohibited and the prohibition period has ended. It should be noted that, in the notification following the end of the prohibition period, notification system 1 causes notification device 2 to perform notification that takes into consideration that the error has occurred in the washing machine during the prohibition period.

2-9. Ninth Operation Example

Figure 14:
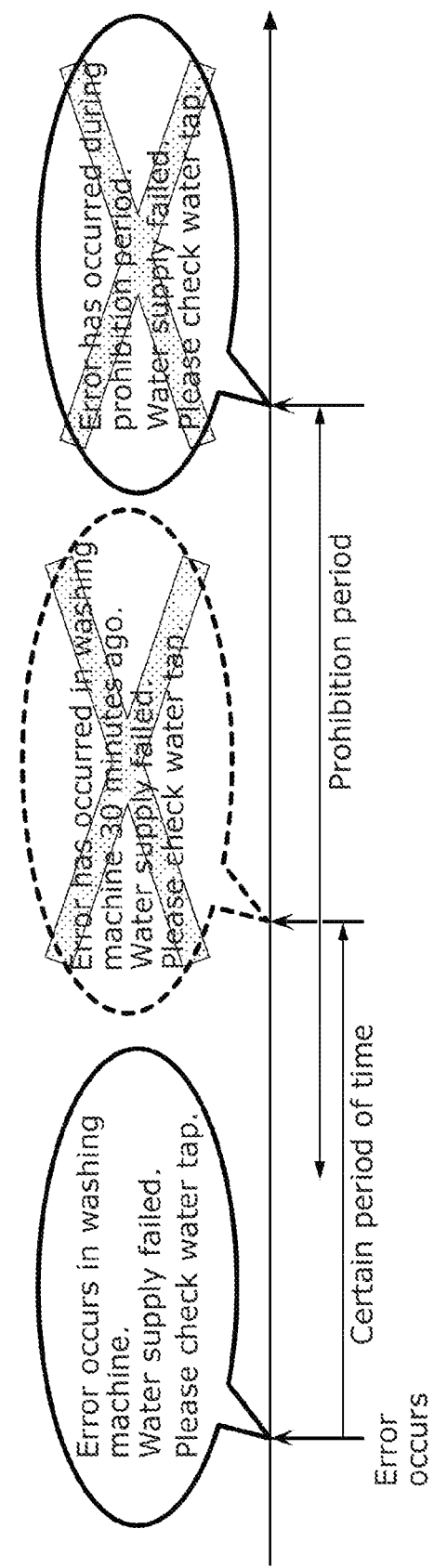
FIG. 14 illustrates a ninth operation example of the notification system according to the embodiment.

FIG. 14 illustrates a ninth operation example of notification system 1 according to the embodiment. In the ninth operation example, the error occurs in the washing machine and the first notification trigger is generated before the prohibition period starts. Therefore, unlike in the eighth operation example, in the ninth operation example, notification system 1 causes notification device 2 to perform notification by voice at the time when the first notification trigger is generated.

Then, unlike in the eighth operation example, in the ninth operation example, notification system 1 does not cause notification device 2 to perform renotification by voice even when the second notification trigger is generated at the time when the prohibition period has ended. Furthermore, in the ninth operation example, although notification system 1 generates the second notification trigger at the time when a certain period of time (30 minutes in this case) has elapsed from when the first notification trigger is generated, notification system 1 does not cause notification device 2 to perform renotification by voice because the second notification trigger is generated during the prohibition period.

2-10. Tenth Operation Example

FIG. 15 illustrates a tenth operation example of notification system 1 according to the embodiment. Unlike in the second operation example, in the tenth operation example, events (errors in this case) occur in two information source devices 3 in addition to the washing machine while user U1 is not present. In other words, in the tenth operation example, an event occurs in each of three information source devices 3. For this reason, in the tenth operation example, notification system 1 generates three first notification triggers corresponding to the three events to thereby cause notification device 2 to perform notification by voice corresponding to each of the three first notification triggers.

In the tenth operation example, notification system 1 generates one comprehensive second notification trigger when user U1 has returned home, instead of generating three second notification triggers corresponding to the three first notification triggers. Then, in the tenth operation example, following the generation of the second notification trigger, notification system 1 causes notification device 2 to perform notification which is a summary of the three events by voice. In other words, in the tenth operation example, when the second notification trigger is generated in a case where a plurality of first notification triggers corresponding to a plurality of mutually different events are generated, processing unit 14 causes notification device 2 to output, as notification information, summary information indicating a summary of the plurality of events.

It should be noted that, in the tenth operation example, in a case where a plurality of first notification triggers are generated in the prohibition period, notification system 1 may generate one comprehensive second notification trigger at the time when the prohibition period has ended. In this case as well, notification system 1 causes notification device 2 to perform notification which is a summary of a plurality of events by voice.

Furthermore, in the tenth operation example, in a case where a plurality of first notification triggers are generated within a predetermined time period, notification system 1 may generate one comprehensive second notification trigger at the time when a certain period of time has elapsed from when the earliest one of the plurality of first notification triggers is generated. In this case as well, notification system 1 causes notification device 2 to perform notification which is a summary of a plurality of events by voice.

It should be noted that, in the tenth operation example, notification system 1 generates one comprehensive second notification trigger when the number of the plurality of first notification triggers is greater than or equal to a predetermined number (a natural number that is greater than or equal to 2). In other words, when the number of the plurality of first notification triggers is less than the predetermined number, notification system 1 generates a plurality of second notification triggers corresponding to the plurality of first notification triggers. In this case, notification system 1 causes notification device 2 to perform notification by voice each time one of the plurality of second notification triggers is generated. The above-described predetermined number can be appropriately set by user U1.

3. Advantages, Etc.

Hereinafter, advantages of notification system 1 (notification method) according to the embodiment will be described.

As described above, there are cases where user U1 is not near notification device 2 when notification device 2 notifies details of an event, such as when user U1 is out or is in a different place from an installation location of notification device 2, for example. In such a case, there is a problem that, if notification by notification device 2 is performed only once, user U1 does not notice occurrence of an event that should be handled and thus cannot handle the event. Furthermore, even when user U1 is near the installation location of notification device 2, there are cases where user U1 does not notice notification by notification device 2 such as when user U1 is asleep or wearing earphones, for example.

In response to this, in notification system 1 (notification method) according to the embodiment, notification device 2 has a plurality of opportunities to perform notification, namely, when a first notification trigger is generated and when a second notification trigger is generated. Accordingly, in notification system 1 (notification method) according to the embodiment, for example, there is an advantage that it becomes easy for user U1 to notice occurrence of an event that should be handled by user U1 even if user U1 does not notice initial notification by notification device 2, because notification device 2 performs renotification. Furthermore, in notification system 1 (notification method) according to the embodiment, for example, there is an advantage that it becomes easy for user U1 to notice occurrence of an event that should be handled by user U1 even if notification is not performed by notification device 2 during a prohibition period, because notification device 2 performs notification when the prohibition period has ended.

[Variations]

The embodiment is described as an exemplification of the technique disclosed in the present application as above. However, the technique in the present disclosure is not limited to the foregoing embodiment, and modifications, interchanges, additions, omissions, etc., to the embodiment can be applied as appropriate. Moreover, various elements described in the above embodiment may be combined to achieve a new embodiment.

In view of this, variations of the embodiment will be exemplified below.

In the embodiment, the predetermined condition may be that user U1 performs predetermined action on information source device 3 or notification device 2. Specifically, second generator 13 may generate the second notification trigger when, after the first notification trigger is generated, user U1 has performed a predetermined action on information source device 3 or notification device 2 and the event information is not updated.

The predetermined action may include that, for example, user U1 operates a particular switch of notification device 2, user U1 performs an operation to check the notification history of notification device 2, or user U1 performs an operation to instruct renotification to notification device 2. Furthermore, the predetermined action may include that, for example, user U1 performs an operation to turn on notification device 2 or information source device 3, or user U1 approaches notification device 2 or information source device 3. The approach of user U1 to notification device 2 or information source device 3 can be detected using a motion detector, for example.

Furthermore, in the embodiment, the output by notification device 2 when the second notification trigger is generated may be larger than the output by notification device 2 when the first notification trigger is generated. For example, in a case where notification device 2 outputs notification information by voice, processing unit 14 may make the voice louder when the second notification trigger is generated than when the first notification trigger is generated. Furthermore, for example, in a case where notification device 2 outputs notification information by displaying, processing unit 14 may make a text, an image, or the like which is displayed on a display larger when the second notification trigger is generated than when the first notification trigger is generated.

In the embodiment, notification device 2 and information source device 3 are separate devices, but are not limited to this configuration. For example, information source device 3 may also serve as notification device 2. For example, when there are a plurality of information source devices 3 and an event occurs in one of the plurality of information source devices 3, another one of the plurality of information source devices 3, which is different from information source device 3 in which the event occurs, may function as notification device 2.

In the embodiment, notification system 1 generates only one second notification trigger for one first notification trigger, but the number of the second notification triggers is not limited to this. For example, notification system 1 may generate a plurality of second notification triggers for one first notification trigger.

Furthermore, for example, notification system 1 is implemented by a single device in the embodiment, but may be implemented by a plurality of devices. When notification system 1 is implemented by a plurality of devices, the constituent elements of notification system 1 may be arbitrarily assigned to the plurality of devices. For example, in the embodiment, a part of the constituent elements of notification system 1 may be provided in a building in which user U1 lives. Specifically, the present disclosure may be realized by cloud computing or edge computing.

Furthermore, for example, in the embodiment, a part of or all of the constituent elements of notification system 1 of the present disclosure may be configured of dedicated hardware, or may be implemented by executing a software program suitable for the constituent elements. The constituent elements may be implemented by a program executor, such as a central processing unit (CPU) or a processor, retrieving and executing a software program stored in a storage medium, such as a hard disk drive (HDD) or a semiconductor memory device.

Furthermore, the constituent elements of notification system 1 of the present disclosure may be configured of one or more electronic circuits. The one or more electronic circuits may be ordinary circuits or dedicated circuits.

The one or more electronic circuits may include, for example, a semiconductor device, an integrated circuit (IC), or a large scale integration (LSI). The IC or the LSI may be integrated on a single chip or a combination of a plurality of chips. Here, the one or more electronic circuits are referred to as an IC or an LSI, but may also be referred to as a system LSI, a very large scale integration (VLSI), or an ultra large scale integration (ULSI), depending on the scale of integration. Furthermore, a field programmable gate array (FPGA) that is programmed after an LSI is manufactured may also be used for the same purpose.

Furthermore, general or specific aspects of the present disclosure may be realized as a system, a device, a method, an integrated circuit, or a computer program. Alternatively, general or specific aspects of the present disclosure may be realized as a non-transitory computer-readable recording medium, such as an optical disk, an HDD, or a semiconductor memory device, in which the computer program is stored. For example, the present disclosure may be realized as a program for causing a computer to execute an air conditioning control method according to the embodiment. Furthermore, the program may be stored in a non-transitory computer-readable recording medium such as a CD-ROM, or may be distributed via a communication path such as the Internet.

Hereinbefore, the embodiment has been described as exemplification of the technique of the present disclosure. To this extent, the accompanying drawings and detailed description are provided.

Accordingly, the constituent elements described in the accompanying drawings and detailed description may include, not only constituent elements essential to solving the problem, but also constituent elements that are not essential to solving the problem in order to exemplify the aforementioned technique. Those unnecessary constituent elements should not be deemed essential due to the mere fact that they are described in the accompanying drawings and the detailed description.

Moreover, the embodiment above shows examples of techniques according to the present disclosure. Thus, various modifications, replacements, additions, omissions, or the like can be made within the scope of the claims or in a scope equivalent to the scope of the claims.

Conclusion

As described above, a notification method according to the embodiment obtains event information about an event that has occurred from information source device 3 or information source service 4 that is a source of information to be notified by notification device 2. Furthermore, the notification method generates a first notification trigger when the event information is obtained. Furthermore, the notification method generates a second notification trigger when, after the first notification trigger is generated, a predetermined condition is satisfied and the event information is not updated. Furthermore, the notification method causes notification device 2 to output notification information indicating the details of the event in at least one of a case where the first notification trigger is generated or a case where the second notification trigger is generated.

Accordingly, for example, there is an advantage that it becomes easy for user U1 to notice occurrence of an event that should be handled by user U1 even if user U1 does not notice initial notification by notification device 2, because notification device 2 performs renotification.

Furthermore, for example, in the notification method, the predetermined condition is that a certain period of time elapses from when the first notification trigger is generated.

Accordingly, for example, there is an advantage that it becomes easy for user U1 to notice notification by notification device 2 even if user U1 does not notice initial notification by notification device 2, because notification device 2 performs renotification after a certain period of time has elapsed.

Furthermore, for example, in the notification method, the predetermined condition is that the first notification trigger is generated while user U1 is not present and user U1 has returned.

Accordingly, for example, there is an advantage that it becomes easy for user U1 to notice notification by notification device 2 even if user U1 does not notice initial notification by notification device 2 when user U1 is not present, because notification device 2 performs renotification when user U1 has returned.

Furthermore, for example, in the notification method, the predetermined condition is that user U1 performs predetermined action on information source device 3 or notification device 2.

Accordingly, for example, there is an advantage that it becomes easy for user U1 to notice notification by notification device 2 even if user U1 does not notice initial notification by notification device 2, because notification device 2 performs renotification when user U1 performs the predetermined action such as operating information source device 3 or notification device 2.

Furthermore, for example, in the notification method, the predetermined condition is that the first notification trigger is generated during a prohibition period in which outputting of notification information by notification device 2 is prohibited and the prohibition period has ended. Furthermore, in the notification method, notification device 2 is prohibited from outputting notification information when the first notification trigger is generated during the prohibition period.

Accordingly, for example, there is an advantage that user U1 is unlikely to feel discomfort because notification device 2 is prohibited from outputting notification information during the prohibition period in which user U1 does not want to receive notification by notification device 2.

Furthermore, for example, in the notification method, when the second notification trigger is generated in a case where a plurality of first notification triggers corresponding to a plurality of mutually different events are generated, notification device 2 is caused to output, as notification information, summary information indicating a summary of the plurality of events.

Accordingly, there is an advantage that, because user U1 receives notification only once when the second notification trigger is generated, user U1 is unlikely to feel discomfort as compared with a case where a plurality of second notification triggers are generated corresponding to a plurality of first notification triggers and notification device 2 performs notification each time one of the plurality of second notification triggers is generated.

Furthermore, for example, in the notification method, output by notification device 2 when the second notification trigger is generated is larger than output by notification device 2 when the first notification trigger is generated.

Accordingly, there is an advantage that it becomes easy for user U1 to notice notification by notification device 2 because notification information in the renotification is outputted by notification device 2 with more emphasis than in the initial notification.

Furthermore, for example, in the notification method, information source device 3 is a home appliance.

According to the notification method, there is an advantage that user U1 can be notified of the occurrence of an event in the home appliance even if the home appliance does not have a notification function.

Furthermore, for example, in the notification method, notification device 2 is a home appliance.

According to the notification method, there is an advantage that user U1 can be notified of the occurrence of an event in information source device 3 or information source service 4 without providing an information terminal, such as a smartphone, in addition to the home appliance.

Furthermore, a program according to the embodiment causes one or more processors to execute the above-described notification method.

According to the notification method, for example, there is an advantage that it becomes easy for user U1 to notice occurrence of an event that should be handled by user U1 even if user U1 does not notice initial notification by notification device 2, because notification device 2 performs renotification.

Furthermore, notification system 1 according to the embodiment includes obtainer 11, first generator 12, second generator 13, and processing unit 14. Obtainer 11 obtains event information about an event that has occurred from information source device 3 or information source service 4 that is a source of information to be notified by notification device 2. First generator 12 generates a first notification trigger when the event information is obtained. Second generator 13 generates a second notification trigger when, after the first notification trigger is generated, a predetermined condition is satisfied and the event information is not updated. Processing unit 14 causes notification device 2 to output notification information indicating the details of the event in at least one of a case where the first notification trigger is generated or a case where the second notification trigger is generated.

Accordingly, for example, there is an advantage that it becomes easy for user U1 to notice occurrence of an event that should be handled by user U1 even if user U1 does not notice initial notification by notification device 2, because notification device 2 performs renotification.

Furthermore, notification device 2 according to the embodiment includes instruction obtainer 21 and outputter 22. Instruction obtainer 21 obtains an instruction for outputting the notification information from notification system 1. Outputter 22 outputs the notification information when the instruction is obtained by instruction obtainer 21.

Accordingly, for example, there is an advantage that it becomes easy for user U1 to notice occurrence of an event that should be handled by user U1 even if user U1 does not notice initial notification by notification device 2, because notification device 2 performs renotification.

INDUSTRIAL APPLICABILITY

The present disclosure can be appropriately applied to, for example, a system that notifies a user of information about an event that has occurred in a device or a service.

The invention claimed is:

1. A notification method comprising:
 obtaining event information about an event that has occurred from an information source device or an information source service that is a source of information to be notified by a notification device;
 generating a first notification trigger when the event information is obtained;
 generating a second notification trigger when, after the first notification trigger is generated, a predetermined condition is satisfied and the event information is not updated, which is determined by comparing the event information and current event information obtained at a time the predetermined condition is satisfied; and
 causing the notification device to output notification information by a voice output, the notification information indicating details of the event in a case where the first notification trigger is generated and in a case where the second notification trigger is generated, wherein:
 the predetermined condition is that:
  the notification information based on the first notification trigger is output while a user is not present at a place, and
  the user, who was absent, has returned to the place,
 the notification information based on the second notification trigger is output after changing content of the notification information based on the first notification trigger to content that takes into consideration that the first notification trigger has been generated, and
 the voice output when the second notification trigger is generated is louder than the voice output when the first notification trigger is generated.

2. The notification method according to claim 1, wherein the predetermined condition is that a certain period of time elapses from when the first notification trigger is generated.

3. The notification method according to claim 1, wherein the predetermined condition is that the user performs predetermined action on the information source device or the notification device.

4. The notification method according to claim 1, wherein the predetermined condition is that the first notification trigger is generated during a prohibition period in which outputting of the notification information by the notification device is prohibited, and the prohibition period has ended, and
 the notification device is prohibited from outputting the notification information when the first notification trigger is generated during the prohibition period.

5. A non-transitory computer-readable recording medium having recorded thereon a program for causing one or more processors to execute the notification method according to claim 1.

6. A notification method comprising:
 obtaining a plurality of event information items, each of which is about a different one of a plurality of events that have occurred from an information source device or an information source service that is a source of information to be notified by a notification device;
 generating, after the plurality of event information items are obtained, a plurality of first notification triggers, each of which corresponds to a different one of the plurality of event information items;
 generating a second notification trigger, after the plurality of first notification triggers are generated, as a result that a predetermined condition is satisfied and the plurality of event information items are not updated, which is determined by comparing the plurality of event information items and a plurality of current event information items obtained at a time the predetermined condition is satisfied;
 causing the notification device to output a plurality of notification information items, each of which indicates details of a different one of the plurality of events corresponding to the plurality of event information items, in a case where the plurality of first notification triggers are generated; and
 causing the notification device to output summary information indicating a summary of the plurality of events in a case where the second notification trigger is generated and information indicating that the plurality of notification information items have been outputted.

7. A notification system comprising:
 an obtainer that obtains event information about an event that has occurred from an information source device or an information source service that is a source of information to be notified by a notification device;
 a first generator that generates a first notification trigger when the event information is obtained;
 a second generator that generates a second notification trigger when, after the first notification trigger is generated, a predetermined condition is satisfied and the event information is not updated, which is determined by comparing the event information and current event information obtained at a time the predetermined condition is satisfied; and
 a processing unit that causes the notification device to output notification information by a voice output, the notification information indicating details of the event in a case where the first notification trigger is generated and in a case where the second notification trigger is generated, wherein:
 the predetermined condition is that:
  the notification information based on the fort notification trigger is output while a user is not present at a place, and
  the user, who was absent, has returned to the place,
 the notification information based on the second notification trigger is output after changing content of the notification information based on the first notification trigger to content that takes into consideration that the first notification trigger has been generated, and the voice output when the second notification trigger is generated is louder than the voice output when the first notification trigger is generated.

8. A notification device comprising:

an instruction obtainer that obtains an instruction for outputting the notification information from the notification system according to claim 7; and an outputter that outputs the notification information when the instruction is obtained by the instruction obtainer.

\* \* \* \* \*